United States Patent [19]

Stigsson

[11] Patent Number: 5,556,605

[45] Date of Patent: Sep. 17, 1996

[54] METHOD OF SEPERATING SULPHUR COMPOUNDS

[75] Inventor: Lars Stigsson, Hammarö, Sweden

[73] Assignee: Chemrec Aktiebolag, Karlstad, Sweden

[21] Appl. No.: 528,662

[22] Filed: Sep. 15, 1995

Related U.S. Application Data

[63] Continuation of Ser. No. 205,651, Mar. 4, 1994, abandoned.

[30] Foreign Application Priority Data

Mar. 11, 1993 [SE] Sweden .................... 9300803

[51] Int. Cl.$^6$ .................... B01D 53/48; B01D 53/52
[52] U.S. Cl. .................... 423/220; 423/231; 423/232; 423/242.1; 423/243.01; 423/573.1
[58] Field of Search .................... 423/220, 231, 423/232, 242.1, 243.01, 573.1; 162/29, 35, 51

[56] References Cited

U.S. PATENT DOCUMENTS

| | | | |
|---|---|---|---|
| 3,183,145 | 5/1965 | Collins, Jr. | 162/51 |
| 3,210,235 | 10/1965 | Ferrigan et al. | 162/30 |
| 3,293,113 | 12/1966 | Venemark | 423/232 |
| 3,554,858 | 1/1971 | Timpe | 162/29 |
| 3,563,695 | 2/1971 | Benson | 23/2 |
| 3,574,556 | 4/1971 | Buxton, Jr. | 423/232 |
| 3,823,222 | 7/1974 | Benson | 423/223 |
| 4,297,330 | 10/1981 | Schlauer et al. | 423/232 |
| 4,431,617 | 2/1984 | Farin | 423/232 |
| 4,808,264 | 2/1989 | Kignell | 162/30.1 |
| 5,234,546 | 8/1993 | Chamblee | 162/14 |

FOREIGN PATENT DOCUMENTS

| | | | |
|---|---|---|---|
| 725072 | 1/1966 | Canada . | |
| 265920 | 3/1989 | Germany | 162/29 |
| 8502731 | 12/1986 | Sweden . | |
| 8702627 | 12/1988 | Sweden . | |
| 8903953 | 5/1991 | Sweden . | |
| 2928870 | 10/1992 | Sweden . | |
| 9302249 | 2/1993 | WIPO . | |

OTHER PUBLICATIONS

Ullmann's Encyclopedia of Industrial Chemistry vol. A12, pp. 262–264.

*Primary Examiner*—Gary P. Straub
*Assistant Examiner*—Timothy C. Vanoy
*Attorney, Agent, or Firm*—Cushman Darby & Cushman

[57] ABSTRACT

A method of separating sulphur compounds out of a gas containing carbon dioxide and hydrogen sulphide, in a gas washing system, said gas being obtained by gasification of spent cellulose liquor. According to the invention the gas washing system has a gas-liquid contact zone (5) operating at a pressure exceeding atmospheric pressure as well as a regeneration zone (8) operating at a pressure substantially less than the pressure in the gas-liquid contact zone (5). The carbon dioxide partial pressure in the gas prior to entering the gas-liquid contact zone exceeds 0.2 atm. Furthermore the gas comes into contact with an alkaline absorption liquid in the gas-liquid contact zone, and alkaline liquid containing alkali hydrogen sulphide is withdrawn from the gas-liquid contact zone and transferred to the regeneration zone, in which zone hydrogen sulphide is expelled from said liquid containing alkali hydrogen sulphide and withdrawn in the form of a gas.

17 Claims, 1 Drawing Sheet

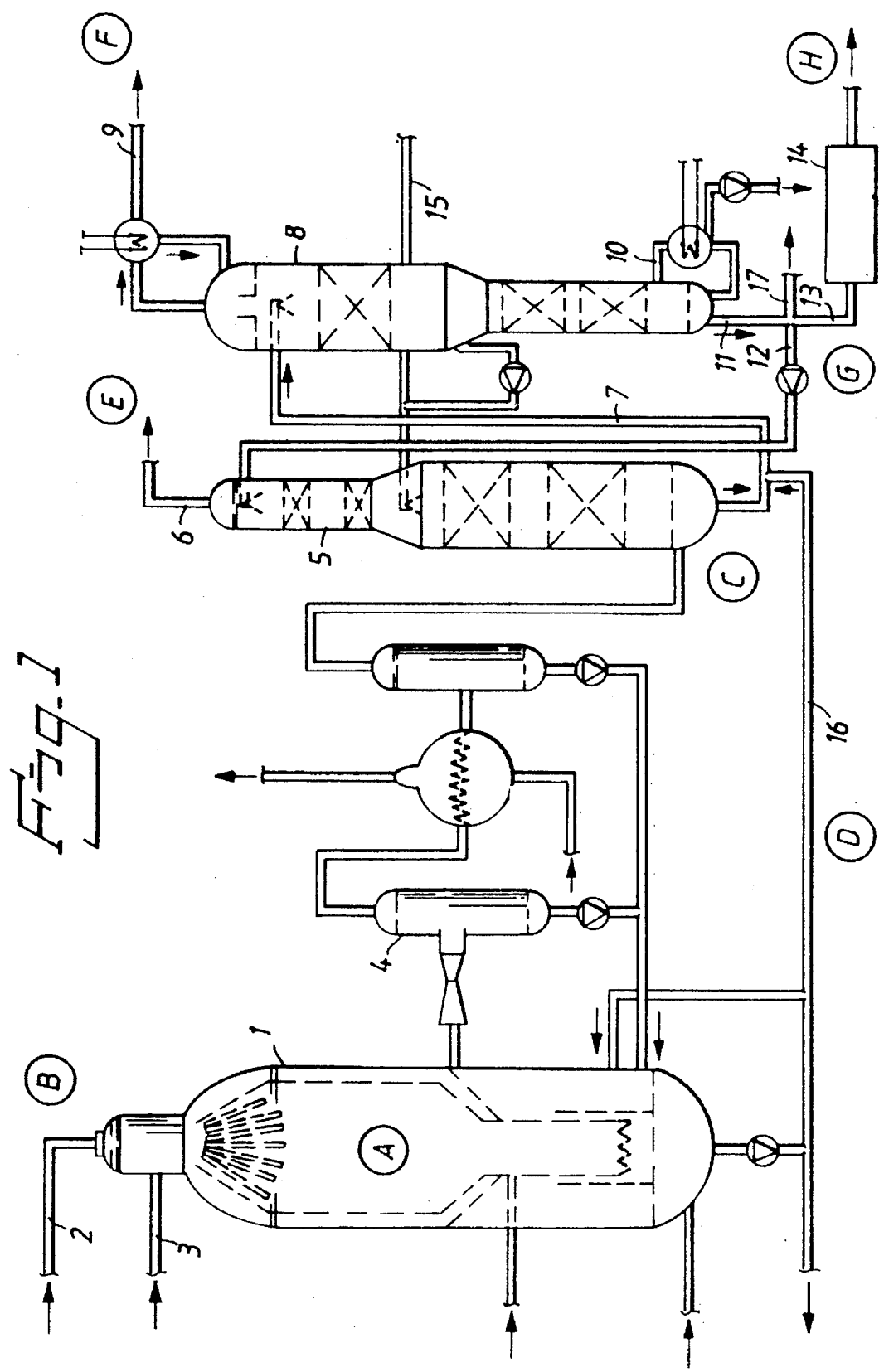

METHOD OF SEPERATING SULPHUR COMPOUNDS

This is a continuation of application Ser. No. 08/205,651, filed on Mar. 4, 1994, now abandoned.

FIELD OF THE INVENTION

The present invention relates to a method of separating sulphur compounds out of a gas flow containing carbon dioxide and hydrogen sulphide, generated in connection with partial oxidation of a spent cellulose liquor under pressure, the gas being supplied to a gas washing system.

BACKGROUND OF THE INVENTION

Chemical pulp can be prepared in many different ways using various chemical and delignification systems. The currently prevailing commercial method is that known as the kraft or sulphate cellulose method.

In sulphate digestion the wood chips are treated with a strongly alkaline digesting liquid, known as white liquor, that contains primarily sodium sulphite and sodium hydroxide as well as inert substances such as sodium carbonate and sodium sulphate.

The majority of the chemicals utilized in the digestion process are recovered by evaporating and combusting the digestion liquid in soda recovery units. The used digestion liquid, known as black liquor, contains dissolved lignin.

The sulphur content of the black liquor is reduced to sulphides in the soda recovery unit and, together with alkali carbonates, forms a melt at the bottom of the unit which is then withdrawn for preparing a new digestion liquid. The organic content of the black liquor is oxidized to liberate heat which is converted to steam in the upper part of the unit.

The melt withdrawn is dissolved in water and produces green liquor. This solution is treated with calcium hydroxide and the white liquor obtained thereafter is re-used in the digestery. The chemical values lost during the delignification process and the recovery are replaced by make-up corresponding to the actual loss of alkali and sulphur.

The recovery boiler or soda recovery unit represents a key function in the traditional sulphate cellulose process. However, the soda recovery unit has a number of significant drawbacks, such as the high investment cost, the relatively low degree of energy efficiency and the risk of melt water explosions. Another drawback is its inherent inflexibility making it impossible to optimize preparation of the digestion liquor. It is therefore for these and other reasons not surprising that industry has sought more satisfactory solutions for the chemical and energy recovering system in chemical pulp factories.

An alternative to the conventional soda recovery unit which is currently being introduced on the commerical market is based on partial oxidation of the black liquor in a gasification reactor to form an alkaline melt and a combustible gas. A decisive advantage of this is that oxidation and reduction occur in separate process units and the system can therefore be optimized both with respect to energy yield and chemical preparation. The present invention relates to a method of separating sulphur and alkali compounds when gasifying spent cellulose liquors. According to the invention the combustible gas formed during gasification is conveyed to a regenerative gas washing system, from whence a gas flow rich in hydrogen sulphide is withdrawn.

It is known in atmospheric gasification of spent cellulose liquors containing sulphur, that sulphur is to a considerable extent converted to hydrogen sulphide, particularly at gasification temperatures lower than about 700° C. It is also known that increased gasification pressure increases the proportion of sulphur in the discontinuous gas phase in accordance with the equilibrium:

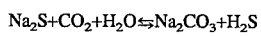

$$Na_2S+CO_2+H_2O \leftrightarrows Na_2CO_3+H_2S$$

Gaseous sulphur is present primarily in the form of $H_2S$, but also in the form of carbonyl sulphide (COS) and simple mercaptans.

This sulphur naturally has a value and must be recovered and returned to the digestion chemical preparation. Neither, for obvious reasons, can the sulphur compounds be permitted to pass to the atmosphere. A method practiced in conventional recovery is to convert gaseous sulphur components in the soda recovery units to sulphate and return this suplhate for recovery. However, such a cycle is both uneconomical and technically complicated in conjunction with gasification.

DESCRIPTION OF THE PRIOR ART

The present prior art concerning pressurized gasification of black liquor and preparation of digestion liquors with high sulphidity is described in the following patent specifications, for instance.

U.S. Pat. No. 4,808,264 describes a process in which the gas from the gasification reactor is brought into contact with water or an alkaline liquid, the gaseous hydrogen sulphide then being absorbed to form alkali sulphide. The gas is then washed with circulating green liquor in a first washing zone followed by washing with a solution containing sodium carbonate or sodium hydroxide and finally by washing with water in order to completely remove sulphur compounds remaining in the gas. In U.S. Pat. No. 4,808,264, therefore, gaseous sulphur compounds are bound in alkaline liquids normally occuring in the digestion liquor system of the pulp factory. The method of separating alkali and sulphur compounds proposed by the present invention cannot be read in U.S. Pat. No. 4,808,264.

SE-8903953-1 describes a method of producing a digestion liquor under reducing conditions, for sulphate pulp digestion in connection with gasification of spent cellulose liquors by adding sulphur compounds occuring in the pulp factory to the gasification reactor. The digestion liquor thereby obtained has a high sulphide content and is used in so-called modified sulphate digestion. SE-8903953-1 does not reveal any method of taking care of and re-using the gaseous sulphur compounds present in the process gas flow. Neither can any method be discerned for separating sulphur and alkali, which is an important feature of the present invention.

CA-725 072 describes an alkaline digestion and recovery process in which the wood material is pre-impregnated with a digestion liquor having high sulphidity in order to improve the yield and the pulp quality of the digestion. The chemicals are recovered in a conventional recovery system with pre-oxidation of the black liquor.

A considerable number of processes are commercially available today for separating acid gases such as carbon dioxide and hydrogen sulphide from synthesis gas flows.

The most usual processes are based on regenerative amine washing systems, but regenerative washing systems based on alkali carbonate, such as the Benfield process described in more detail in U.S. Pat. No. 3,563,695 and U.S. Pat. No. 3,823,222, are also used.

Common to these types of washing systems is that the absorption liquid is recirculated without direct bleeding and supply of alkali, which is a decisive difference as compared with the present invention. Furthermore, these washing systems are not integrated in systems for gasification of spent cellulose liquors with internal preparation of digestion liquors and alkali substantially free from sulphides.

A primary object of the present invention is to provide an effective method of separating sulphur and alkali in the recovery system described.

The method according to the invention is characterized in that the gas washing system contains a gas-liquid contact zone operating at a pressure exceeding atmospheric pressure; that the gas washing system contains a regeneration zone operating at a pressure substantially less than the pressure in said gas-liquid contact zone; that the carbon dioxide partial pressure in the gas prior to entering the gas-liquid contact zone exceeds 0.2 atm; that the gas is brought into contact with an alkaline absorption liquid in the gas-liquid contact zone; and that alkaline liquid containing alkali hydrogen sulphide is withdrawn from the gas-liquid contact zone and transferred to the regeneration zone, in which zone hydrogen sulphide is expelled from said liquid containing alkali hydrogen sulphide and withdrawn in the form of a gas.

The invention will be described further with reference to the drawings in which

BRIEF DESCRIPTION OF THE DRAWING

FIG. 1 shows a plant for separating alkali and sulphur.

DETAILED DESCRIPTION OF THE INVENTION

Spent cellulose liquor 2 is supplied to a pressurized reactor 1 together with a gas 3 containing oxygen, the spent cellulose liquor being partially oxidized in the reactor thereby forming a melt and a hot combustible gas. The hot combustible gas is rapidly cooled through direct contact with an alkaline liquid in which melt formed is dissolved and withdrawn. At the same time the cooled gas becomes saturated with steam and acquires a temperature of about 110°–200° C., corresponding to the temperature at which the coolant boils at the relevant pressure.

At partial oxidation of a spent sulphate liquor at 25 atm reactor pressure and with a supply of air corresponding to 45% of the stoichiometric requirement, a gas is obtained with approximately the following composition:

| | |
|---|---|
| CO | 10–15% (dry gas) |
| $H_2$ | 12–20% |
| $CH_4$ | 1–4% |
| $CO_2$ | 10–15% |
| $H_2S$ | 0.5–4% |
| COS | 0.02–0.5% |
| $N_2$ | balance |

After cooling and separation of the alkali the gas is further cooled through indirect heat-exchange in a heat-exchange unit 4 to a temperature within the range 80°–180° C., and is transferred to a gas-liquid contact zone 5 in the form of an absorption column, for instance, where the gas comes into contact with an alkaline absorption liquid. The pressure in the gas-liquid contact zone 5 corresponds substantially to the pressure in the gasification reactor 1 minus the pressure drop in the pipes.

The alkaline absorption liquid may suitably be a sodium carbonate solution with a concentration of 2–5 moles and have a temperature substantially corresponding to that of the saturated gas. The following reaction occur in the gas-liquid contact zone 5:

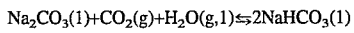

and

Thus both carbon dioxide and hydrogen sulphide are absorbed in the absorption liquid, the liquid then being withdrawn from the gas-liquid contact zone 5.

The absorption process can be continued to varying extents with respect to the hydrogen sulphide and carbon dioxide by varying the contact time, liquid/gas flow ratio and temperature, for instance. Additives of various types, such as amines, may be added in order to achieve selective absorption of hydrogen sulphide.

Alkali fumes and alkali particles accompanying the gas from the gasification are also efficiently separated out in the gas-liquid contactor 5.

The gas obtained from gasifiction of spent cellulose liquors also contains carbonyl sulphide COS, which gas is to a great extent converted by means of hydrolysis in the gas-liquid contactor according to

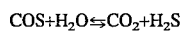

Carbon sulphide $CS_2$ is also present in the process gas and is similarly removed by means of hydrolysis in two steps, first to carbonyl sulphide and hydrogen sulphide, and then by hydrolysis as above.

During normal conditions over 90% of the carbonyl sulphide and 75–85% of the carbon disulphide is separated out with a gas washing system in accordance with the present invention.

Other components that may be present, such as mercaptans, thiophens, hydrogen cyanide and ammonia, are separated out with the absorption liquid to varying extents.

These components form different compounds with the absorption liquid, such as mercaptides, sulphates, thiosulphates, thiocyanates, polysulphides and elementary sulphur, which can be accumulated in a regenerative absorption system. Such accumulation is avoided in the present invention by bleeding liquids from the gas washing system and adding make-up liquids to the gas washing system from the digestion liquor system of the pulp factory and/or from the alkaline circulation liquids of the gasification system.

The process gas 6, substantially freed from acid gas components and alkali fumes, can then be used for producing energy in a steam boiler, for instance, or in a gas turbine plant.

The liquid 7 containing alkali hydrogen carbonate which is withdrawn from the absorber is transferred to a regeneration zone 8 operating at a relatively low pressure, preferably about or below atmospheric pressure.

The concentration of the acid gas components $H_2S$ and $CO_2$ in the absorption liquid is extremely dependent on the partial pressure of the gases above the liquid, and both $CO_2$ and $H_2S$ are forced out of the absorption liquid at a drop in pressure and can thus be withdrawn from the regeneration zone in the form of gas 9. Removal of the acid gases is an endothermic process and energy must be supplied to the regeneration zone 8 in the form of direct or indirect steam heat 10, for instance. In the present invention the regeneration is operated to such a low $NaHCO_3$ remainder in the liquid 11 withdrawn as is practically possible. A liquid 11 is thus obtained consisting mainly of dissolved alkali carbonate.

A considerable proportion, approaching 70%, of the acid gases is suitably expelled by allowing the absorption liquid to flash into the regeneration zone, either in a special flash chamber or in direct conjunction with the regeneration zone. The gas 9 containing hydrogen sulphide and carbon dioxide obtained in the regeneration zone 8 is withdrawn and used for preparing digestion liquor, for instance.

The liquid 11 substantially freed from sulphur and carbon dioxide is withdrawn from the regeneration zone 8 and returned, after bleeding, to the gas-liquid contactor 5 in the form of regenerated absorption liquid 12. A part 13 of the liquid flow from the regeneration zone may be bled off according to the invention to produce an alkali hydroxide substantially free from sulphide, in a causticizing plant 14.

Decisive for the suitability of the method described is that the gas conveyed to the gas-liquid contact zone 5 has a carbon dioxide partial pressure exceeding about 0.2 atm and preferably exceeding 1 atm. At lower carbon dioxide partial pressure a very great contact volume is required in the gas-liquid contactor 5 and the whole process thus becomes uneconomic.

It is suitable to perform the absorption at a total pressure of between about 10 and 30 atm.

Supplying the gas washing system with alkali containing sulphides, such as green liquor 15 from the green liquor system of the factory or quench and cooling liquids 16 from black liquor gasification, enables an equivalent liquid flow to be withdrawn from the washing system with alkali substantially free from sulphides.

As one skilled in the art will appreciate, such a separation of sulphur and alkali has considerable advantages in a pulp factory and a number of alternative applications are suggested below for the gas containing hydrogen sulphide and the alkali free from sulphides.

The gas containing hydrogen sulphide can be oxidized and the sulphur converted to elementary sulphur in a Claus process or through catalytic oxidation in an alkaline water solution with iron complex. The sulphur thus obtained can be mixed with the digestion liquor for preparing polysulphides, which has long been known as a way of increasing the digestion yield. Alternatively the gas containing hydrogen sulphide may be utilized, preferably after having been freed from carbon dioxide, for pre-impregnating the wood chips prior to digestion, or utilized in some other manner in connection with digestion.

According to another procedure a hydrogen sulphide flow substanially free of carbon dioxide is allowed to react with white liquor for preparing a digestion liquor having high sulphidity.

Yet another procedure is to allow a hydrogen sulphide flow substantially free from carbon dioxide, or elementary sulphur produced as described above, to react with a digestion liquor prepared in accordance with the procedure described in SE-8903953-1. The digestion liquor thereby obtained has high sulphidity and can be further treated with mild catalytic oxidation, for instance, whereby a considerable proportion of the sulphur in the digestion liquor can be converted to polysulphides.

The hydrogen sulphide flow from the regeneration zone can also be used for preparing sulphite digestion liquor, in which case the hydrogen sulphide is oxidized to sulphur dioxide which is absorbed in an alkaline liquid such as one withdrawn from the regeneration zone.

Sulphur dioxide produced in this way can also be used for preparing sulphuric acid, or it may be used directly or indirectly for adjusting the pH value in the bleaching department.

The liquid withdrawn from the regeneration zone is devided into at least two part-flows, one of which is returned to the liquid-gas contactor and the other of which can be used for preparing sodium hydroxide in a special causticizing plant. The sodium hydroxide obtained is substantially free from sulphur and can be used, for instance, for oxygen gas bleaching, peroxide bleaching, at alkali extraction in a bleaching sequence, or exported.

The gas containing hydrogen sulphide formed during partial oxidation of spent cellulose liquor can also be supplied directly or indirectly to a plant for separation of sulphur such as a so-called Stretford process, Sulfint process, Locat process or Takahax process, described in more detail in Ullman Vol. A12, pages 262–264. Common to these processes are that hydrogen sulphide is oxidized in liquid phase with a catalyst such as a metal salt or a metal chelating complex. Various iron compounds are particularly suitable whereby chelate-linked $Fe^{3+}$ is reduced to $Fe^{2+}$.

A drawback of the processes described above is that sulphur is present in solid form after the separation, as well as the considerable cost of the catalyst.

The present invention can be modified in several ways such as by replacing the sodium with potassium as alkali base in the process, or by supplying other liquids such as weak liquor or white liquor to the gas-liquid contactor.

Anyone skilled in the art will realize the significance of internally generating alkali free from sulphides from the factory's green liquor system according to the invention, and the invention can be applied and utilized in many different ways that are not specified in more detail here. The invention is therefore only limited by the appended claims.

The invention is exemplified and clarified below by an example wherein the capitals A to H refer to FIG. 1.

EXAMPLE 1

A chemical pulp factory has two production lines with a total production of 600,000 ton pulp per year divided into a sulphate pulp line of 400,000 ton per year and an NSSC pulp line of 200,000 ton per year. A Chemrec gasifier 1, described in more detail in SE-8702627-4 and U.S. Pat. No. 4,808,264, for instance, is installed to relieve existing soda recovery units and also to prepare sulphite digestion liquor and produce alkali free from sulphide. The Chemrec gasifier 1 has a capacity of 10 ton dry solids content per hour. The plant is also equipped with a regenerative gas washing system comprising an absorber 5 and stripper 8 for the production of alkali free from sulphide, and hydrogen sulphide for preparation of NSSC liquor.

The following data apply for the gasification system:

| Gasifier (A) | |
|---|---|
| Operating pressure | 20 bar |
| Operating temperature | 975° C. |
| Air factor | 0.42 |
| Air temperature | 500° C. |
| Thick liquor to gasifier (B) | |
| Flow | 10 ton DS/h |
| Dryness content | 70% |
| Temperature | 150° C. |

| -continued | |
|---|---|
| Thermal value | 14.4 MJ/kg DS |
| Sulphur | 61 kg/ton DS |
| Gas before washing system (C) | |
| Composition, percent by volume | |
| CO | 12 |
| $H_2$ | 14 |
| $CH_4$ | 1.4 |
| $CO_2$ | 12.1 |
| $H_2O$ | 5 |
| $H_2S$ | 0.70 |
| COS | 0.03 |
| $N_2$ | balance |
| Flow | 22,000 $Nm^3/h$ |
| Temperature | 105° C. |
| Green liquor from quench and cooling system (D) | |
| Flow | |
| $Na_2CO_3$ | 30 kmol/h |
| $NaHCO_3$ | 15 kmol/h |
| NaHS | 11.5 kmol/h |
| Concentration | 150 g/l (alkali in total) |

The gas with its content of carbon dioxide, hydrogen sulphide and alkali fumes is added to the gas washing system after cooling. The following data are applicable for the gas washing system:

| Gas out from absorber (E) | |
|---|---|
| Composition, percent by volume | |
| CO | 13.5 |
| $H_2$ | 15.5 |
| $CH_4$ | 1.5 |
| $CO_2$ | 1.2 |
| $H_2O$ | 5.5 |
| $H_2S$ | 0.01 |
| COS | 0.003 |
| Gas flow | 19,700 $Nm^3/h$ |
| Temperature | 103° C. |
| Effective thermal value | 4.1 $MJ/Nm^3$ (dry gas) |
| Gas out from stripper (F) | |
| $H_2S$ | 18.8 kmol/h |
| $CO_2$ | 123 kmol/h |
| Temperature | 100° C. |
| Pressure | 0.9 bar |
| Alkali withdrawn from stripper (G) | |
| $Na_2CO_3$ | 43 kmol/h |
| NaHS | 0.1 kmol/h |

The alkali 11 withdrawn from the stripper 8 is divided into two part-flows. A main flow 12 is returned to the absorber 5, one part-flow 17 is used for preparation of NSSC digestion liquid and one part-flow 13 is withdrawn for production of alkali substantially free from sulphides in a separate causticizing plant 14.

| Sodium hydroxide production in causticizing plant (H) | |
|---|---|
| Causticizing efficiency | 85% |
| NaOH production | 2950 kg/h (100%) |

Preparation of Sulphite Digestion Liquor $SO_2$ production from stripper gas through oxidation of $H_2S$ corresponds to 18.8 kmol/h or 1203 kg/h.

$SO_2$ produced may either be reacted with NaOH solution as follows:

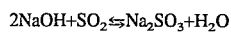

or with $Na_2CO_3$ solution as follows:

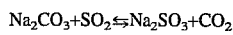

The sulphite digestion liquid thus obtained is returned to the NSSC digestion department.

The present invention is exemplified above with black liquor as fuel for the gasifier. Other spent cellulose liquors can also be advantageously used as a basis when practising the invention. Among these may be mentioned sulphite liquor, soda digestion liquor and concentrated waste from the bleaching department.

We claim:

1. A method for separating sulphur compounds from a gas flow containing carbon dioxide and hydrogen sulphide, generated in connection with partial oxidation of a spent cellulose liquor under pressure, comprising the steps of:

supplying the gas to a gas washing system comprised of:
a gas-liquid contact zone (5) operating at a pressure exceeding atmospheric pressure; and
a regeneration zone (8) operating at a pressure less than the pressure in the gas-liquid contact zone (5);

introducing the gas into the gas-liquid contact zone (5), the gas having a carbon dioxide partial pressure exceeding 0.2 atm;

contacting the gas with an alkaline absorption liquid containing alkali metal compounds in the gas-liquid contact zone (5);

withdrawing an alkaline liquid (7) containing alkali metal hydrogen sulphide from the gas-liquid contact zone (5);

transferring the alkaline liquid (7) to the regeneration zone (8);

expelling the hydrogen sulphide from the alkali liquid containing alkali metal hydrogen sulphide;

withdrawing from the regeneration zone (8) the hydrogen sulfide in the form of a gas (9);

withdrawing an alkaline liquid (12) containing substantially alkali metal carbonate from the regeneration zone (8) and recirculating the alkaline liquid to the gas-liquid contact zone (5);

supplying a second alkaline liquid containing carbonate, hydrogen carbonate, or a combination thereof in excess of the liquid (12) recirculated from the regeneration zone (8) to the gas washing system; and withdrawing a liquid flow (13, 17) from the regeneration zone (8) and removing the liquid flow (13, 17) from the gas washing system, the liquid flow (13, 17) substantially corresponding in amount to the supply of the second alkaline liquid containing carbonate, hydrogen carbonate, or a combination thereof, the liquid flow including being substantially free from sulphides.

2. A method as claimed in claim 1, further comprising the step of preparing alkali hydroxide from alkaline liquid (13) removed from the gas washing system.

3. A method as claimed in claim 1, wherein the second alkaline liquid supplied to the contact and/or regeneration zones (5, 8) originates entirely or partly from a plant for partial oxidation of spent cellulose liquor (2).

4. A method as claimed in claim 1, wherein the the second alkaline liquid supplied to contact and/or regeneration zones (5, 8) originates entirely or partly from a green liquor system of a pulp factory.

5. A method as claimed in claim 1, wherein the gas-liquid contact zone (5) operates at a temperature substantially corresponding to the boiling point of the alkaline absorption liquid at atmospheric pressure.

6. A method as claimed in claim 1, wherein the regeneration zone (8) operates at a total pressure less than the total pressure in the gas-liquid contact zone (5).

7. A method as claimed in claim 1, further comprising the step of preparing digested liquors from the gas (9) containing hydrogen sulphide withdrawn from the regeneration zone (8).

8. A method as claimed in claim 7, further comprising the step of preparing, polysulphides and/or alkali sulphides from the gas (9) containing hydrogen sulphide withdrawn from the regeneration zone (8).

9. A method as claimed in claim 7, further comprising the steps of:
   oxidizing the hydrogen sulfide gas (9) hydrogen withdrawn from the regeneration zone (8) into sulfur dioxide; and
   preparing sulphite digesting liquor and/or adjusting the pH value in a bleaching sequence.

10. A method as claimed in claim 7, further comprising the step of transferring the gas (9) containing hydrogen sulphide withdrawn from the regeneration zone (8) to a digesting system of a pulp factory.

11. A method as claimed in claim 1, further comprising the steps of:
   withdrawing a gas (6) substantially freed from hydrogen sulphide and containing hydrogen gas and carbon monoxide from the gas-liquid contact zone (5); and
   producing energy from the gas (6) withdrawn from the gas-liquid contact zone (5).

12. A method as claimed in claim 1, wherein the alkaline liquid (12) consists essentially of sodium compounds.

13. A method as claimed in claim 1, wherein the gas containing carbon dioxide that is supplied to the gas-liquid contact zone (5) is saturated with steam and has a temperature between 80° and 140° C.

14. A method as claimed in claim 1, wherein the carbon dioxide partial pressure in the gas prior to entering the gas-liquid contact zone(s) exceeds 1 atm.

15. A method as recited in claim 1, wherein the alkaline liquid contains a chelated metal.

16. A method as claimed in claim 15, wherein the chelated metal consists of iron.

17. A method for separating sulphur compounds from a gas flow containing carbon dioxide and hydrogen sulphide, comprising the steps of:
   receiving a spent cellulose liquor from pulping or bleaching operations in a pulp mill;
   partially oxidizing under pressure the spent cellulose liquor to generate a gas flow containing carbon dioxide and hydrogen sulphide under pressure
   supplying the gas to a gas washing system comprised of:
      a gas-liquid contact zone (5) operating at a pressure exceeding atmospheric pressure; and
      a regeneration zone (8) operating at a pressure less than the pressure in the gas-liquid contact zone (5);
   introducing the gas into the gas-liquid contact zone (5), the gas having a carbon dioxide partial pressure exceeding 0.2 atm;
   contacting the gas with an alkaline absorption liquid containing alkali metal compounds in the gas-liquid contact zone (5);
   withdrawing an alkaline liquid (7) containing alkali hydrogen sulphide from the gas-liquid contact zone (5);
   transferring the alkaline liquid (7) to the regeneration zone (8);
   expelling the hydrogen sulphide from the alkaline liquid containing alkali metal hydrogen sulphide;
   withdrawing from the regeneration zone (8) the hydrogen sulfide in the form of a gas (9);
   withdrawing an alkaline liquid (12) containing substantially alkali metal carbonate from the regeneration zone (8) and recirculating the alkaline liquid to the gas-liquid contact zone (5);
   supplying a second alkaline liquid containing carbonate, hydrogen carbonate, or a combination thereof in excess of the liquid (12) recirculated from the regeneration zone (8) to the gas washing system; and
   withdrawing a liquid flow (13, 17) from the regeneration zone (8) and removing the liquid flow (13, 17) from the gas washing system, the liquid flow (13, 17) substantially corresponding in amount to the supply of the second alkaline liquid containing carbonate, hydrogen carbonate, or a combination thereof, the liquid flow being substantially free from sulphides;
   introducing the liquid flow (13, 17) to a pulp mill as a source for preparation of chemicals for pulping and bleaching operations.

* * * * *